United States Patent [19]

Reeder et al.

[11] Patent Number: 5,704,273
[45] Date of Patent: Jan. 6, 1998

[54] HYDRAULIC SYSTEM FOR ACCOMMODATING FLUID PRESSURE VARIATIONS

[75] Inventors: Scot C. Reeder; Robert J. McMullen, both of Kansas City; Roger D. Hanaway, Blue Springs, all of Mo.

[73] Assignee: Midland Brake, Inc., Kansas City, Mo.

[21] Appl. No.: 778,902

[22] Filed: Jan. 3, 1997

[51] Int. Cl.$^6$ ........................................ F01B 31/00
[52] U.S. Cl. ........................ 92/130 A; 188/170; 92/63
[58] Field of Search ................ 188/170; 303/9.76, 303/71, 87; 267/162; 92/63, 130 A

[56] References Cited

U.S. PATENT DOCUMENTS

| | | |
|---|---|---|
| 546,441 | 9/1895 | Vogt . |
| 3,382,772 | 5/1968 | Kampert et al. . |
| 3,557,665 | 1/1971 | Von Lewis ............... 188/170 X |
| 3,908,804 | 9/1975 | Cochran . |
| 4,072,360 | 2/1978 | Carroll et al. . |
| 4,350,053 | 9/1982 | Folger . |
| 4,472,995 | 9/1984 | Persson . |
| 4,496,033 | 1/1985 | Hall et al. . |
| 4,609,076 | 9/1986 | Collins et al. . |

Primary Examiner—Robert J. Oberleitner
Assistant Examiner—Pamela J. Lipka
Attorney, Agent, or Firm—St. Onge Steward Johnston & Reens

[57] ABSTRACT

A hydraulic system for accommodating fluid pressure variations is provided. The system includes a housing for an actuating piston with the housing having a first end with a hydraulic fluid port and a second end. The actuating piston includes a body portion, having a face, and a rod portion. A first resilient member is confined between the actuating piston and the second end of the housing. A second resilient member is confined between the body portion and the face of the actuating piston. The face of the actuating piston is preferably a pressure accommodating piston which moves relative to the body portion of the actuating piston. Preferably, the second resilient member has a tension force greater than the tension force of the first resilient member. As the actuating piston moves against the bias of the first resilient member toward the second end of the housing in response to hydraulic fluid entering the housing through the fluid port, the movement of the actuating piston is limited by a stop. If there is an increase in hydraulic fluid pressure with the actuating piston in the stopped position, the additional pressure is accommodated by compression of the second resilient member.

13 Claims, 4 Drawing Sheets

HYDRAULIC SYSTEM FOR ACCOMMODATING FLUID PRESSURE VARIATIONS

FIELD OF THE INVENTION

The invention relates to a system for accommodating fluid pressure variations, and more specifically to a piston assembly in a hydraulic system for accommodating hydraulic fluid pressure variations.

BACKGROUND OF THE INVENTION

Fluid systems employing piston assemblies are known. For example, U.S. Pat. No. 3,382,772 discloses a piston head assembly for hydraulic rams or cylinders having a pair of annular half piston heads with an annular resilient member mounted therebetween. The piston head assembly is bidirectional in response to hydraulic fluid pressure.

U.S. Pat. No. 4,350,053 discloses an automatically resettable actuating device responsive to a sudden change in fluid pressure having a helical spring abutting a floating piston and an actuating piston, and a reset spring situated between the actuating piston and an end wall, where the helical spring is strong enough to overcome the opposing force of the reset spring. A sudden loss of fluid pressure in the area between the actuating piston and the end wall causes the automatic resetting of an overspeed link whether or not the fluid pressure returns to normal.

U.S. Pat. No. 4,496,033 to Hall discloses nested pistons for an aircraft hydraulic disk brake system which operate together at a certain threshold level of hydraulic fluid pressure to provide an output actuating force.

Hydraulic systems, such as a SAHR brake system for vehicles, are also known. Generally, SAHR brakes operate in the following manner: a spring normally biases a piston which applies the brakes, and normal operation of a brake release actuator causes pressurized hydraulic fluid to move the piston against spring bias to release the brakes.

In the brakes-released position, the SAHR brake system has pressurized hydraulic fluid present which is necessary in maintaining the brakes in the released position. When the temperature of the pressurized hydraulic fluid increases, as normally occurs during continuous operation of the vehicle, the hydraulic fluid "expands" due to thermal effects. This thermal expansion of the hydraulic fluid must be accommodated by the SAHR brake system because otherwise, there may be excessive pressure present within the system possibly resulting in serious damage to the components of the system.

The prior art SAHR brake systems for vehicles have generally dealt with the problem of thermally expanding hydraulic fluid by two methods. The first method concerns providing an overpressure relief mechanism which reduces the pressure within the system by removing some hydraulic fluid from the brake system. Although overpressure relief mechanisms generally perform their intended purpose satisfactorily, they are less than satisfactory from an efficiency perspective. This is because after hydraulic fluid has been removed via an overpressure relief mechanism, if temperature of the pressurized hydraulic fluid remaining in the brake system decreases (e.g., because vehicle is no longer being operated in stop-and-go traffic), more hydraulic fluid will need to be pumped into the brake system to maintain the brakes in the fully released position. As the temperature of the hydraulic fluid in the brake system fluctuates, there may be many occasions where the need to pump hydraulic fluid back into the brake system arise. The constant removal and replacement of hydraulic fluid is inefficient and energy-consuming.

The second method concerns allowing the expanding hydraulic fluid to simply move the piston further against the spring to absorb the thermal expansion. The disadvantage of this method is that compression of the spring beyond its normal compression weakens the spring, thereby reducing the life and effectiveness of the spring and posing a safety hazard. Furthermore, wheel end components connected to the spring are also moved beyond the intended design position, and where the thermal expansion of the hydraulic fluid is significant, such wheel end components may sustain serious damage.

Therefore, what is desired is a hydraulic system which economically and reliably accommodates hydraulic fluid pressure variations without expelling fluid or overcompressing the brake apply spring which may cause damage to components of the system.

SUMMARY OF THE INVENTION

Accordingly, it is one object of the invention to provide a hydraulic system for economically and reliably accommodating fluid pressure variations.

Another object of the invention is to provide a hydraulic brake system which neither expels fluid nor overcompresses the brake apply spring.

A further object of the invention is to provide a hydraulic system of the above character having a piston made of two parts with a resilient member therebetween for accommodating pressure variations.

Yet another object of the invention is to provide a hydraulic system of the above character in which fluid pressure moves a piston against the brake apply spring to a solid stop which prevents overcompression of the spring.

Still another object of the invention is to provide a hydraulic system for economically and reliably accommodating pressure variations using two spring members, one spring member having a tension force greater than the other spring member.

These and other objects of the invention are achieved by a hydraulic system for accommodating fluid pressure variations. The system includes a housing for an actuating piston with the housing having a first end with a hydraulic fluid intake/outlet port and a second end. The actuating piston includes a body portion, having a face, and a rod portion. A first resilient member is confined between the actuating piston and the second end of the housing. A second resilient member is confined between the body portion and the face of the actuating piston.

The face of the actuating piston preferably comprises a pressure accommodating piston which moves relative to the body portion of the actuating piston. Preferably, the second resilient member has a tension force greater than the tension force of the first resilient member.

As the actuating piston moves against the bias of the first resilient member toward the second end of the housing in response to hydraulic fluid entering the housing through the fluid port, the movement of the actuating piston is limited by a stop. If there is an increase in hydraulic fluid pressure with the actuating piston in the stopped position, the additional pressure is accommodated by compression of the second resilient member.

The invention and its particular features and advantages will become more apparent from the following detailed description considered with reference to the accompanying drawings.

3

DETAILED DESCRIPTION OF THE INVENTION

Figure 1:
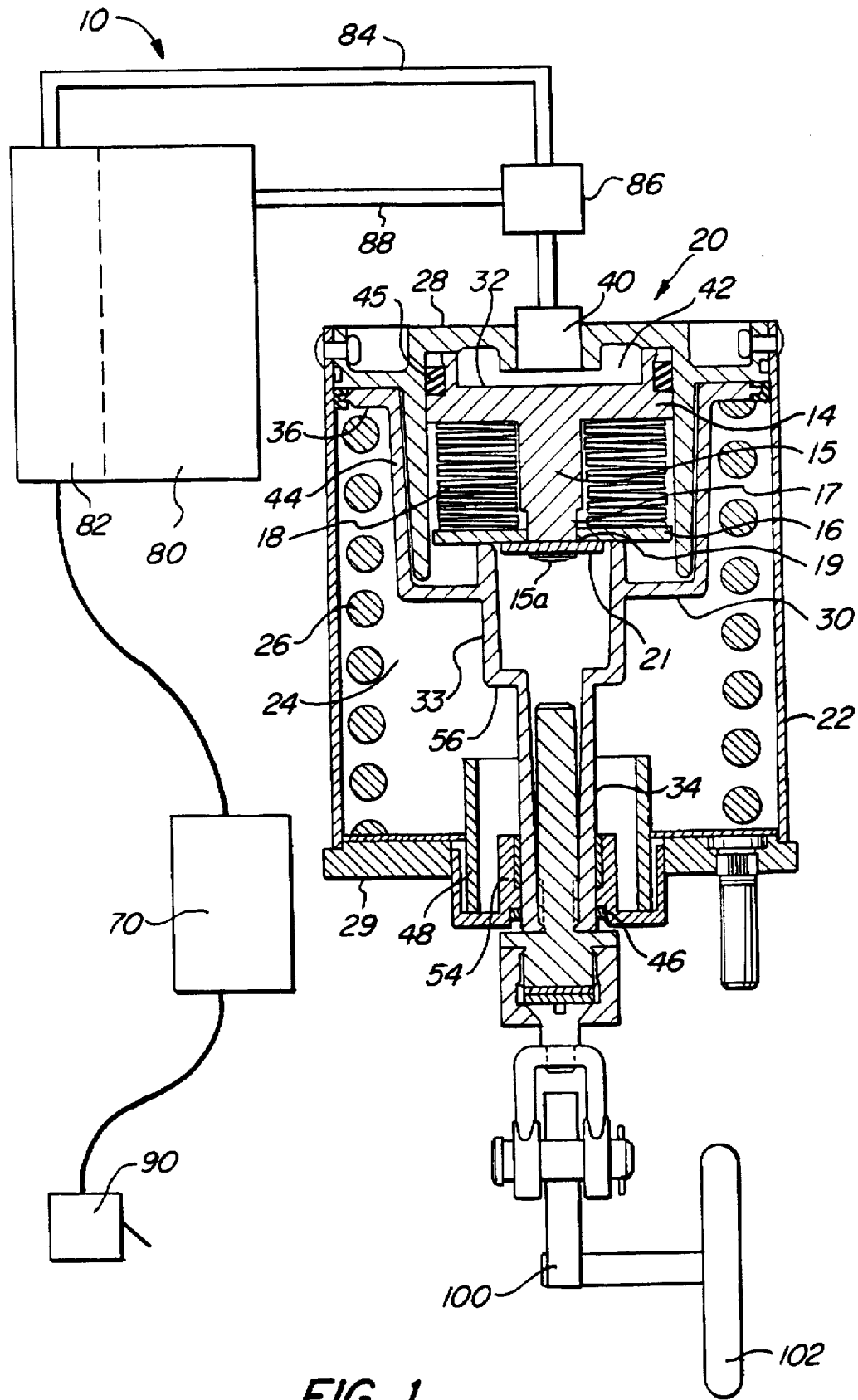
FIG. 1 is a schematic diagram of a hydraulic system including a cross section of a piston assembly for accommodating fluid pressure variations in accordance with the invention.

FIG. 1 schematically shows a fluid system 10, which for purposes of illustration is a spring apply, hydraulic release brake system. The system 10 includes a piston assembly 20 of the present invention shown in cross section, which has a housing 22 with a first end 28 and a second end 29 defining a large-diameter bore 24. A first resilient member 26, such as a compression coil spring, is disposed in the large-diameter bore 24. An actuating piston 30 having a body portion 33, including a face 32, and a rod portion 34 is slidably disposed in the large-diameter bore 24 and has a ledge 36 about the face 32 abutting the first resilient member 26 such that the first resilient member 26 is confined between the ledge 36 and the second end 29 of the housing 22. In FIG. 1, the actuating piston 30 is shown in the brake-engaged position.

The face 32 of the actuating piston 30 of the present invention is shown as a pressure accommodating piston having a first piston member 14 and a second piston member 16. Disposed between the first piston member 14 and the second piston member 16 is a second resilient member 18, such as a disc-type spring, which has a tension force greater than the tension force of the first resilient member 26. As defined herein, "tension force" means resistance to compression. The first piston member 14 includes a central extension 15 having an annular groove 17 about its distal end 15a. The second piston member 16 has an aperture 19 sized to correspond to the circumference of the annular groove 17 so that the second piston member 16 is received by the distal end 15a of the extension 15 of the first piston member 14 when the piston members 14 and 16 are joined to form the pressure accommodating piston. After the piston members 14 and 16 are joined together, a retaining ring 21 is placed on the distal end 15a of the extension 15 to retain the second piston member 16 thereon. The second piston member 16 is also retained on the distal end 15a of the extension 15 by the body portion 33 of the actuating piston 30 which it abuts. The function of the pressure accommodating piston and the second resilient member 18 will be described hereinbelow.

The first end 28 of the housing 22 has a fluid intake/outlet port 40 through which hydraulic fluid enters or leaves the piston assembly 20 to engage or disengage a brake 100 on a wheel 102. The intake/outlet port 40 communicates with a hydraulic fluid reservoir 42 defined by a surrounding wall 44 affixed to the first end 28 which is sealingly, slidably engaged by the pressure accommodating piston. As the pressure accommodating piston slides within the surround-

4 ing wall 44, the sealing engagement of the pressure accommodating piston with the inner surface of the wall 44 is maintained by sealing means 45, such as gaskets or a sealing ring preferably made out of rubber material.

The second end 29 of the housing 22 has an opening 46 which corresponds to the diameter of the rod portion 34 of the actuating piston 30 so that the rod portion 34 can pass therethrough. Surrounding the opening 46 is a wall 48 affixed to the second end 29 which extends partially into the large-diameter bore 24. Immediately adjacent the opening 46 is a rim 54 for blocking an annular elbow 56 formed by the border between the body portion 33 and the rod portion 34 of the actuating piston 30 so that the movement of the actuating piston 30 in the direction of the second end 29 (brake-disengaged position) is limited thereto (see FIG. 3).

The hydraulic fluid to be introduced into or withdrawn from the piston assembly 20 is stored in a storage unit 80. A hydraulic pump 82 in fluid communication with the storage unit 80 is used to introduce or withdraw the hydraulic fluid via a hydraulic fluid fill/relieve line 84. An overpressure relief valve 86 located along the hydraulic fluid fill/relieve line 84 is in fluid communication with the storage unit 80 via an overpressure relief dump line 88. The function of the overpressure relief valve 86 is to permit hydraulic fluid which has been forced out of the hydraulic fluid reservoir 42 of the piston assembly 20 by excess pressure therein to return to the storage unit 80 via the overpressure relief dump line 88.

Excess pressure is extant in the piston assembly 20 when, for example, the temperature of the hydraulic fluid in the fluid reservoir 42 increases during continuous operation of a vehicle. Note that during operation of a vehicle, hydraulic fluid must be present in the piston assembly 20 to maintain the brakes in the disengaged position (see FIGS. 3 and 4). This temperature increase causes thermal expansion of the hydraulic fluid in the reservoir 42, which results in the excess pressure. Unlike prior art hydraulic systems, the excess pressure in the piston assembly 20 of the present invention does not promptly cause some hydraulic fluid in the fluid reservoir 42 to be forced out through the intake/outlet port 40. Instead, the excess pressure is relieved by compression of the second resilient member 18. As will be described hereinbelow with respect to FIGS. 3 and 4, only when the excess pressure exceeds the compressibility of the second resilient member 18 will hydraulic fluid be forced out through the intake/outlet port 40.

Electrically coupled to the hydraulic pump 82 is an electronic control unit 70 which controls operation of the pump 82. The electronic control unit 70 is also electrically coupled to a switch 90 which permits an operator of the vehicle to engage or disengage the brakes 100 by actuating the switch 90. When the switch 90 is actuated, the electronic control unit 70 activates the pump 82 accordingly so that hydraulic fluid is introduced into or withdrawn from the fluid reservoir 42 of the piston assembly 20.

Figure 2:
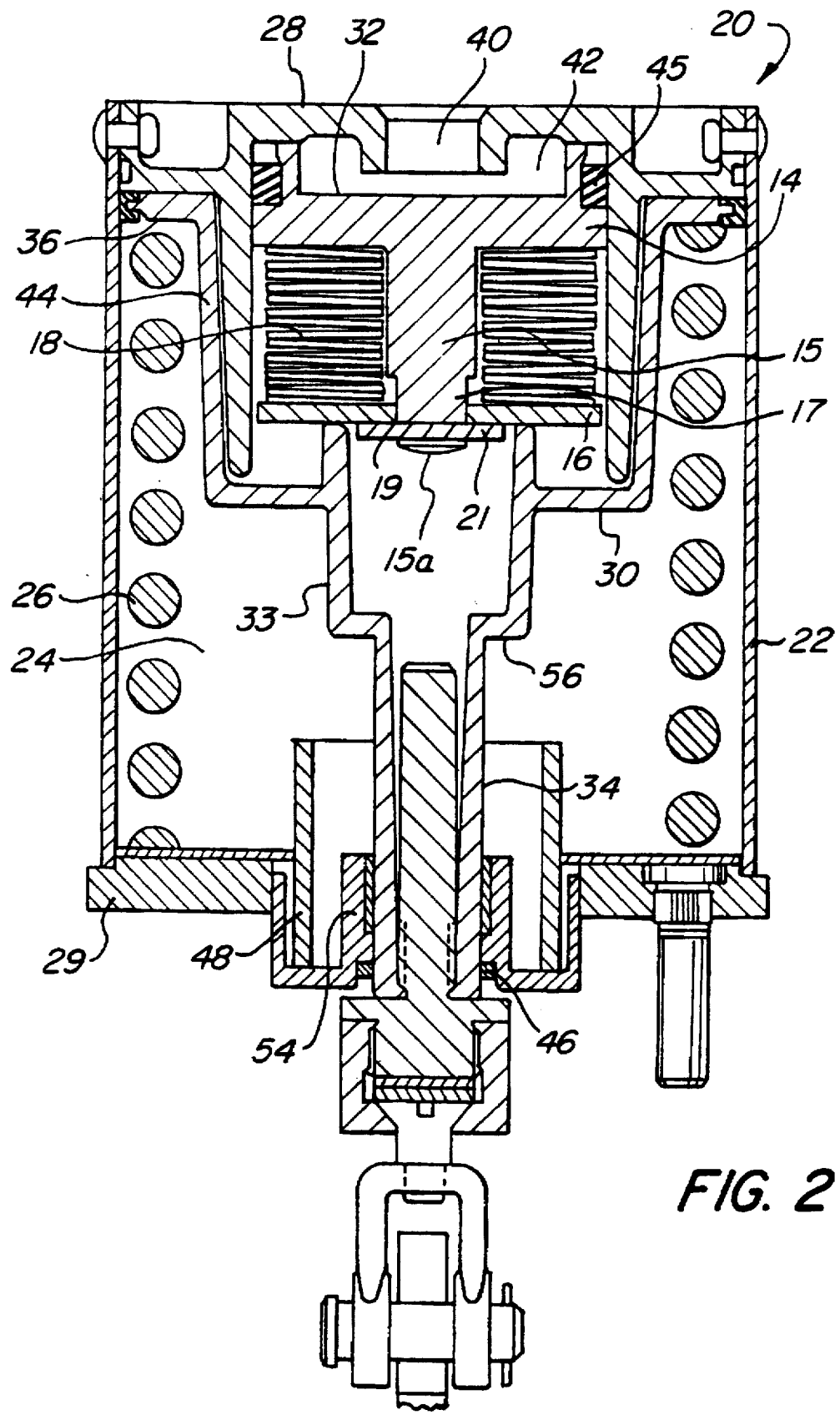
FIG. 2 is an enlarged cross-sectional view of the piston assembly of FIG. 1 showing the actuating piston in the brake-engaged position.
Figure 3:
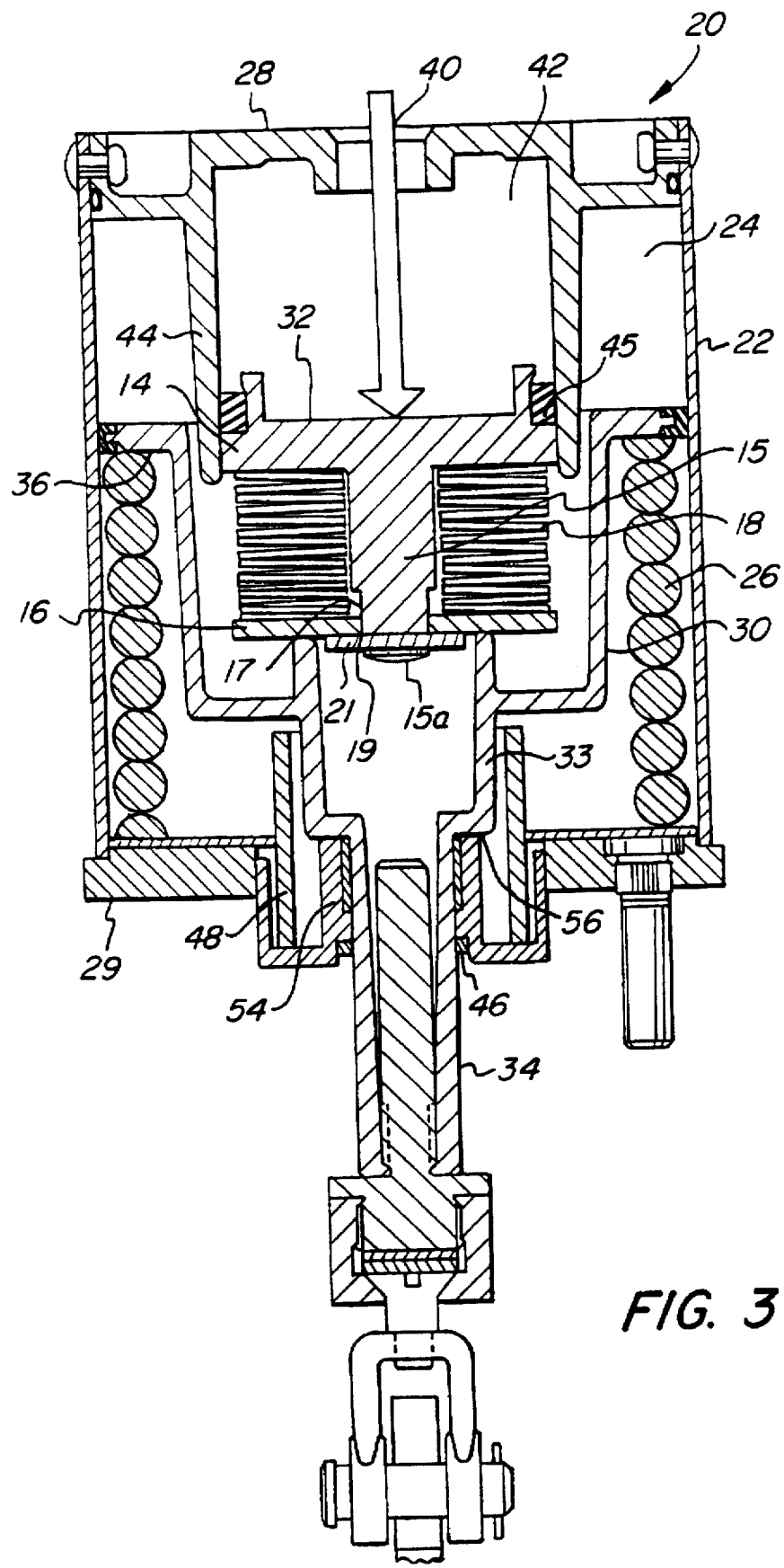
FIG. 3 is an enlarged cross-sectional view of the piston assembly of FIG. 1 showing the actuating piston in the brake-disengaged position.

FIGS. 2 and 3 are enlarged views of the cross-sectional piston assembly 20 of FIG. 1. In FIG. 2, the actuating piston 30 is in the brake-engaged position, while in FIG. 3, the actuating piston 30 is in the brake-disengaged position. Note that in the brake-disengaged position of FIG. 3, the annular elbow 56 of the actuating piston 30 is abutting the rim 54, thereby preventing any further movement of the actuating piston 30 in the direction of the second end 29 of the housing 22.

Figure 4:
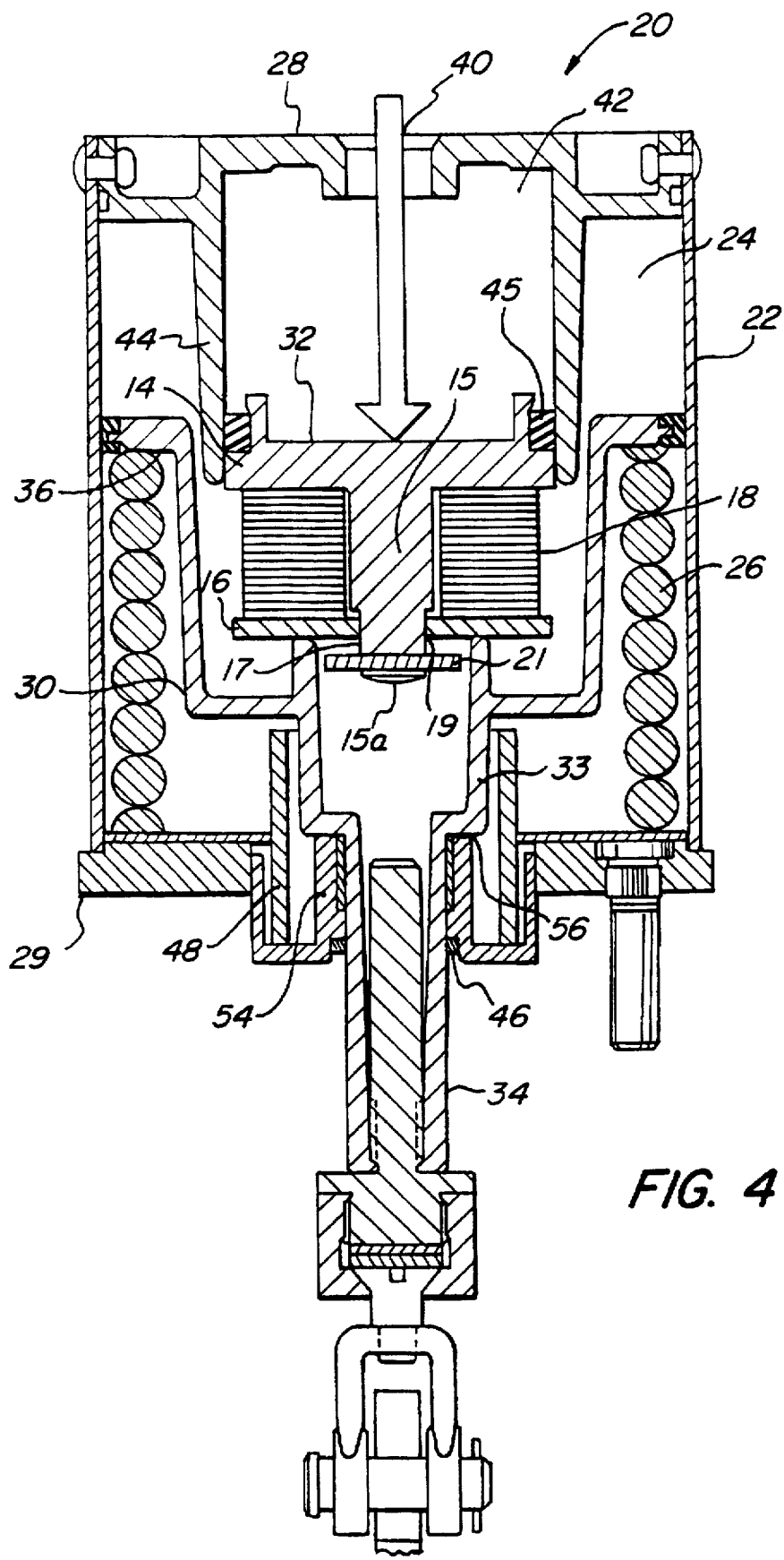
FIG. 4 is an enlarged cross-sectional view of the piston assembly of FIG. 1 showing the actuating piston in the brake-disengaged position with the pressure accommodating piston compressed by excess hydraulic fluid pressure.

FIG. 4 is the cross-sectional piston assembly 20 of FIG. 3 with the second resilient member 18 compressed. As discussed above, the tension force of the second resilient member 18 is greater than the tension force of the first resilient member 26. Therefore, when hydraulic fluid is pumped into the hydraulic fluid reservoir 42 to disengage the brakes 100, the pressure from the hydraulic fluid causes the first resilient member 26 to compress first. This results in the actuating piston 30 moving to the brake-disengaged position shown in FIG. 3.

At the brake-disengaged position, if the hydraulic fluid in the reservoir 42 exerts additional pressure on the pressure accommodating piston 32 (for example, due to temperature increase of the hydraulic fluid), then this additional pressure is relieved by the compression of the second resilient member 18 as shown in FIG. 4. If the second resilient member 18 is fully compressed but there is still excess pressure being exerted by the hydraulic fluid in the reservoir 42, then this pressure will cause some hydraulic fluid to be forced out through the intake/outlet port 40. In this manner, fluid pressure in the piston assembly 20 is accommodated without repeated removal and replacement of hydraulic fluid from the piston assembly 20.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A hydraulic system for accommodating fluid pressure variations, comprising:

a housing having a hydraulic fluid port;

an actuating piston having a face and mounted inside said housing with the face adjacent the fluid port;

a first resilient member located between said housing and said actuating piston for biasing said actuating piston to a first position, said actuating piston movable against the bias of said first resilient member when hydraulic fluid enters said housing through the hydraulic fluid port and applies pressure to the face of said actuating piston;

a stop member for limiting the extent of movement of said actuating piston against the bias of said first resilient member to a second position, said stop member preventing overcompression of said first resilient member; and a second resilient member disposed inside said actuating piston having a tension force greater than the tension force of said first resilient member, said second resilient member being compressible to accommodate an increase in hydraulic fluid pressure when said actuating piston has reached the second position.

2. The hydraulic system of claim 1, wherein the face of said actuating piston comprises a pressure accommodating piston comprising a first piston member and a second piston member, said second resilient member disposed between said first piston member and second piston member.

3. The hydraulic system of claim 1, further comprising a pump connected to the hydraulic fluid port via a hydraulic fluid line for introducing and withdrawing hydraulic fluid from said housing.

4. The hydraulic system of claim 3, further comprising a control unit electrically coupled to said pump for controlling operation of said pump.

5. A hydraulic brake system for accommodating hydraulic fluid pressure variations, comprising:

a housing having a hydraulic fluid port;

an actuating piston having a face and mounted inside said housing with the face adjacent the fluid port, the movement of said actuating piston mechanically engaging or disengaging a brake mechanism;

a first spring member located between said housing and said actuating piston for biasing said actuating piston to a first position corresponding to the brake mechanism being engaged, said actuating piston movable against the bias of said first spring member when hydraulic fluid enters said housing through the hydraulic fluid port and applies pressure to the face;

a stop member for limiting the extent of movement of said actuating piston against the bias of said first spring member to a second position corresponding to the brake mechanism being disengaged, said stop member preventing overcompression of said first spring member; and a second spring member disposed inside said actuating piston having a tension force greater than the tension force of said first spring member, said second spring member being compressible to accommodate an increase in hydraulic fluid pressure when said actuating piston has reached the second position.

6. The hydraulic brake system of claim 5, wherein the brake system is a spring apply, hydraulic release brake system.

7. The hydraulic brake system of claim 5, wherein the face of said actuating piston comprises a pressure accommodating piston comprising a first piston member and a second piston member, said second spring member being disposed between said first and second piston members.

8. The hydraulic brake system of claim 5, further comprising a pump connected to the hydraulic fluid port via a hydraulic fluid line for introducing and withdrawing hydraulic fluid from said housing.

9. The hydraulic brake system of claim 8, further comprising a control unit electrically coupled to said pump for controlling operation of said pump.

10. A method for accommodating fluid pressure variations in a hydraulic system, comprising the steps of:

providing a housing having a hydraulic fluid port;

providing an actuating piston mounted inside said housing, said actuating piston having a face adjacent the fluid port;

providing a first resilient member located between said housing and said actuating piston for biasing said actuating piston to a first position, said actuating piston movable against the bias of said first resilient member when hydraulic fluid enters said housing through the hydraulic fluid port and applies pressure to the face of said actuating piston;

limiting the movement of said actuating piston against the bias of said first resilient member to a second position; and providing a second resilient member disposed inside said actuating piston, said second resilient member having a tension force greater than the tension force of said first resilient member to accommodate hydraulic fluid pressure increase only when said actuating piston has reached the second position.

11. The method of claim 10, wherein the face of said actuating piston comprises a pressure accommodating piston comprising a first piston member and a second member, said second resilient member being disposed between said first and second piston members.

12. The method of claim 10, including the step of providing a pump connected to the hydraulic fluid port via a hydraulic fluid line for introducing and withdrawing hydraulic fluid from said housing.

13. The method of claim 12, including the step of providing a control unit electrically coupled to said pump for controlling operation of said pump.

* * * * *